(12) United States Patent
Kobayashi et al.

(10) Patent No.: US 11,425,517 B2
(45) Date of Patent: Aug. 23, 2022

(54) CONVERSATION SUPPORT SYSTEM, METHOD AND PROGRAM FOR THE SAME

(71) Applicant: NIPPON TELEGRAPH AND TELEPHONE CORPORATION, Tokyo (JP)

(72) Inventors: Kazunori Kobayashi, Tokyo (JP); Shoichiro Saito, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/264,174

(22) PCT Filed: Jul. 29, 2019

(86) PCT No.: PCT/JP2019/029685
§ 371 (c)(1),
(2) Date: Jan. 28, 2021

(87) PCT Pub. No.: WO2020/027061
PCT Pub. Date: Feb. 6, 2020

(65) Prior Publication Data
US 2021/0314714 A1    Oct. 7, 2021

(30) Foreign Application Priority Data
Aug. 2, 2018 (JP) .............................. JP2018-145951

(51) Int. Cl.
*H04R 27/00* (2006.01)
*B60N 2/90* (2018.01)
(Continued)

(52) U.S. Cl.
CPC .............. *H04R 27/00* (2013.01); *B60N 2/90* (2018.02); *G06F 3/165* (2013.01);
(Continued)

(58) Field of Classification Search
None
See application file for complete search history.

(56) References Cited

U.S. PATENT DOCUMENTS 6,980,663 B1 * 12/2005 Linhard .............. G10L 21/0208
381/77
7,415,116 B1 * 8/2008 Fels ........................ B60R 11/02
381/86
(Continued)

FOREIGN PATENT DOCUMENTS

EP      3312839 A1      4/2018
JP      11-342799 A     12/1999
(Continued)

OTHER PUBLICATIONS

"Technology of 'Intelligent microphone for car'", [online], 2018, Nippon Telegraph and Telephone Corporation, accessed May 24, 2018, Internet, Retrieved from: URL:http://www.ntt.co.jp/news2018/1802/pdf/180219c.pdf.

*Primary Examiner* — Paul W Huber

(57) ABSTRACT

A conversation support system supports conversation of passengers in an automobile. Seats of at least two or more rows are placed in the automobile, and the conversation support system includes a speech switching control part configured to designate a desired sound pickup and reproduce area based on designation by a first passenger sitting in a first seat, a first target speech emphasizing part configured to output a signal obtained by emphasizing speech emitted from the designated sound pickup and reproduce area to a loud speaker corresponding to the first seat, and a second target speech emphasizing part configured to output the signal obtained by emphasizing speech, which is collected with a microphone corresponding to the first seat and which
(Continued)

is emitted from the first seat, to a loud speaker corresponding to the sound pickup and reproduce area.

7 Claims, 11 Drawing Sheets

(51) Int. Cl.
| | | |
|---|---|---|
| *G06F 3/16* | (2006.01) | |
| *G10L 21/0232* | (2013.01) | |
| *H04R 1/40* | (2006.01) | |
| *H04R 3/00* | (2006.01) | |
| *H04R 3/12* | (2006.01) | |
| *G10L 21/0208* | (2013.01) | |
| *G10L 21/0216* | (2013.01) | |

(52) U.S. Cl.
CPC .......... *G10L 21/0232* (2013.01); *H04R 1/403* (2013.01); *H04R 1/406* (2013.01); *H04R 3/005* (2013.01); *H04R 3/12* (2013.01); *G10L 2021/02082* (2013.01); *G10L 2021/02166* (2013.01); *H04R 2227/009* (2013.01); *H04R 2499/13* (2013.01)

(56) References Cited

U.S. PATENT DOCUMENTS

| | | | |
|---|---|---|---|
| 8,824,697 B2 * | 9/2014 | Christoph | H04R 3/005 |
| | | | 381/86 |
| 9,881,632 B1 | 1/2018 | Every | |
| 10,002,601 B2 | 6/2018 | Mohammad et al. | |
| 2011/0216913 A1 * | 9/2011 | Bonne | H04R 5/02 |
| | | | 381/77 |
| 2015/0006167 A1 * | 1/2015 | Kato | G10L 15/22 |
| | | | 704/231 |
| 2016/0029111 A1 * | 1/2016 | Wacquant | H04R 3/005 |
| | | | 381/71.4 |
| 2016/0171964 A1 | 6/2016 | Kim et al. | |
| 2016/0174010 A1 * | 6/2016 | Mohammad | H04M 9/082 |
| | | | 381/302 |

FOREIGN PATENT DOCUMENTS

| | | |
|---|---|---|
| JP | 2005161873 A | 6/2005 |
| JP | 2018-116130 A | 7/2018 |

* cited by examiner

CONVERSATION SUPPORT SYSTEM, METHOD AND PROGRAM FOR THE SAME

CROSS-REFERENCE TO RELATED APPLICATIONS

This application is a U.S. 371 Application of International Patent Application No. PCT/JP2019/029685, filed on 29 Jul. 2019, which application claims priority to and the benefit of JP Application No. 2018-145951, filed on 2 Aug. 2018, the disclosures of which are hereby incorporated herein by reference in their entireties.

TECHNICAL FIELD

The present invention relates to a sound pickup and amplification technology for allowing smooth conversation inside an automobile using a microphone and a loud speaker.

BACKGROUND ART

A function called in-car communication or conversation assist has been increasingly mounted on automobiles (see Non-patent literature 1). This function collects voice of a person who sits in a front seat and reproduces the voice at a back seat so as to make it easier for passengers to hold a conversation. Additionally, there is also a function which collects voice on the back seat and reproduces the voice at the front seat.

PRIOR ART LITERATURE

Non-Patent Literature

Non-patent literature 1: "Technology of 'Intelligent microphone for car'", [online], 2018, Nippon Telegraph and Telephone Corporation, accessed May 24, 2018, Internet, Retrieved from: URL:http://www.ntt.co.jp/news2018/1802/pdf/180219c.pdf

SUMMARY OF THE INVENTION

Problems to be Solved by the Invention

Systems of in-car communication mainly focus on assisting conversation between a front seat and a back seat, and cannot produce an effect on conversation between a passenger on a third seat and a passenger on a second seat (see FIG. 1). However, a situation can easily occur where conversation is hard to hear between the first seat and the second seat. Examples of such a situation can include, for example, particularly, a case where a car audio, or the like, is turned on. A problem to be solved is therefore to enable a sound amplification function to be utilized on an arbitrary seat regardless of a position of the seat.

Further, the in-car communication function does not have to be always activated, and it is sufficient if the function allows a passenger to hold a conversation with another passenger when they desire to hold a conversation. This function therefore should be set so as to be able to change operation when a passenger on an arbitrary seat desires to hold a conversation or desires to stop the conversation.

The present invention is directed to providing a conversation support system which is capable of changing operation when a passenger on an arbitrary seat desires to hold a conversation or desires to stop the conversation regardless of a position of a seat and a row, and a method and a program for the conversation support system.

Means to Solve the Problems

To solve the above-described problem, according to one aspect of the present invention, a conversation support system supports conversation of passengers in an automobile. Seats of at least two or more rows are placed in the automobile, and the conversation support system includes a speech switching control part configured to designate a desired sound pickup and reproduce area based on designation by a first passenger sitting in a first seat, a first target speech emphasizing part configured to output a signal obtained by emphasizing speech emitted from the designated sound pickup and reproduce area to a loud speaker corresponding to the first seat, and a second target speech emphasizing part configured to output a signal obtained by emphasizing speech, which is collected with a microphone corresponding to the first seat and which is emitted from the first seat, to a loud speaker corresponding to the sound pickup and reproduce area.

Effects of the Invention

According to the present invention, it is possible to provide effects of enabling operation to be changed when a passenger on an arbitrary seat desires to hold a conversation or desires to stop the conversation regardless of a position of a seat and a row.

DETAILED DESCRIPTION OF THE EMBODIMENTS

Figure 1:
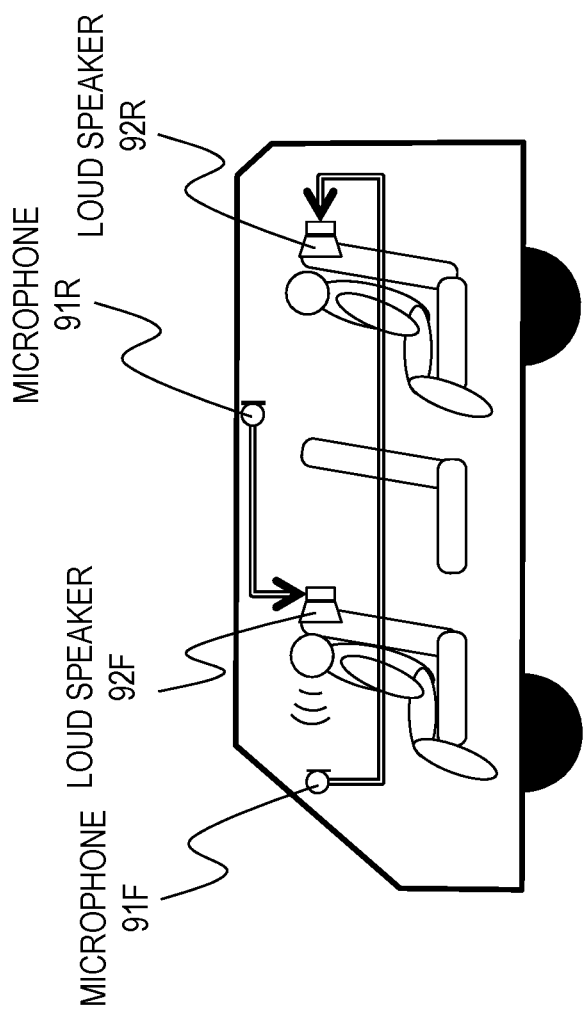
FIG. 1 is a view for explaining in-car communication.

An embodiment of the present invention will be described below. Note that the same reference numerals will be assigned to components having the same functions and steps of performing the same processing in the drawings used in the following description, and overlapped description will be omitted. In the following description, processing to be performed in unit of each element of a vector and a matrix is applied to all elements of the vector and the matrix unless otherwise specified.

<Points of First Embodiment>

Filter coefficients corresponding to respective loudspeakers are prepared in accordance with acoustic paths of loudspeakers at seats of three rows, and the loudspeakers are caused to operate in coordination with operation of in-car communication so as to achieve stable conversation through the loudspeakers. Note that the acoustic paths described here refer to paths of sound which are defined from relationship between sound pickup and sound emission of microphones and loudspeakers respectively corresponding to two rows (for example, a front row and a back row) for which it is desired to assist in-car communication.

First Embodiment

Figure 2:
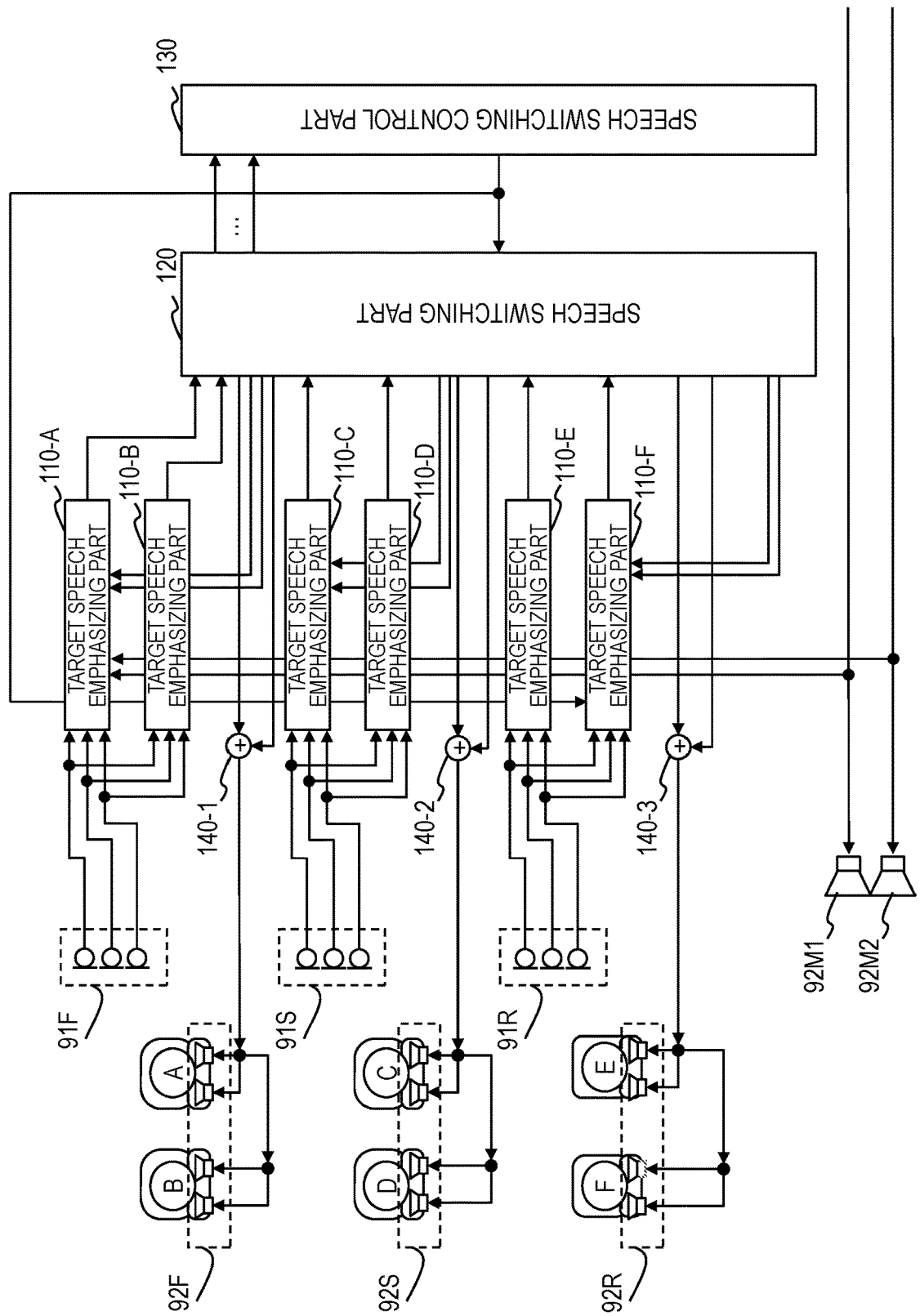
FIG. 2 is a functional block diagram of a conversation support system according to a first embodiment.
Figure 3:
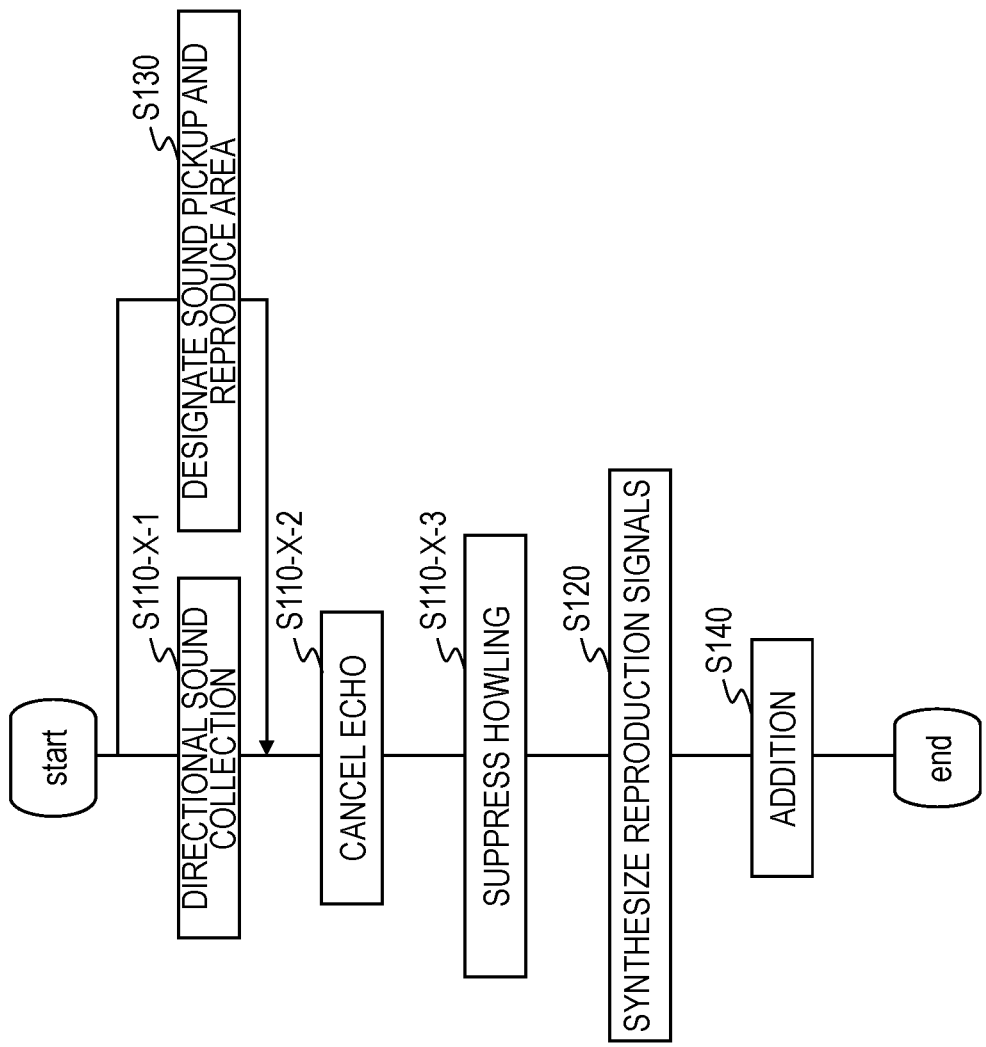
FIG. 3 is a view illustrating an example of processing flow of the conversation support system according to the first embodiment.

FIG. 2 is a functional block diagram of a conversation support system according to a first embodiment, and FIG. 3 illustrates processing flow of the conversation support system.

The conversation support system includes six target speech emphasizing parts 110-X, and a speech switching part 120, a speech switching control part 130, and three adding parts 140-$p$. However, it is assumed that X=A, B, C, D, E, F, and p=1, 2, 3. Note that A, B, C, D, E and F are indexes indicating respective seats, and respectively indicate a first right seat, a first left seat, a second right seat, a second left seat, a third right seat and a third left seat with respect to a traveling direction of an automobile. p is an index indicating a row of the seat.

Figure 4:
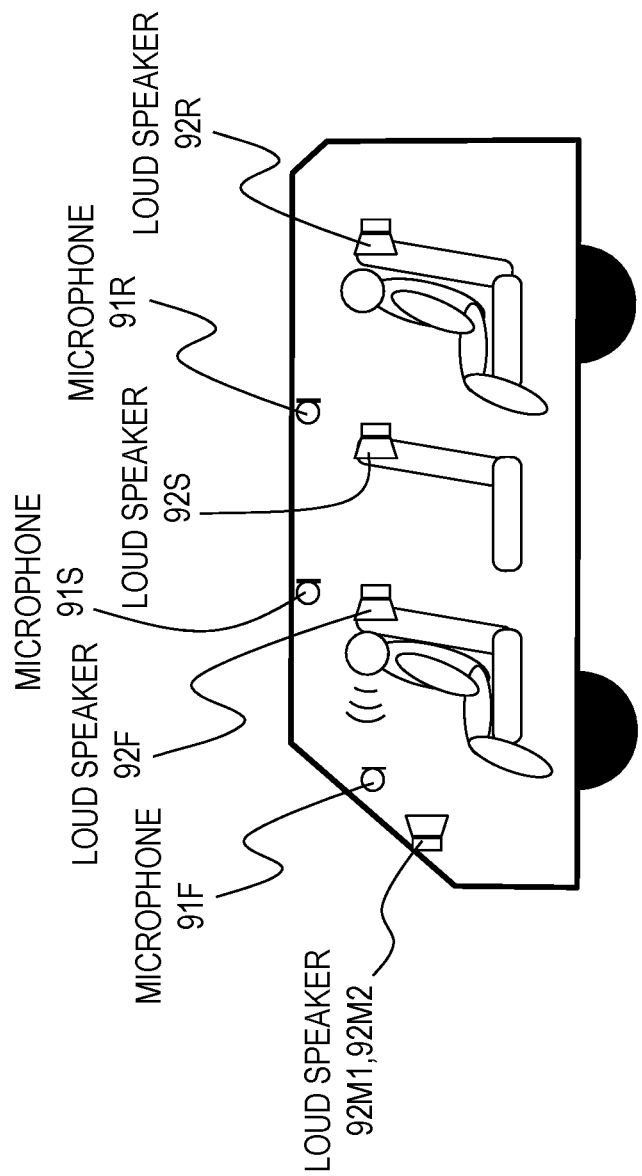
FIG. 4 is a view for explaining a structure of a vehicle on which the conversation support system according to the first embodiment is to be mounted.
Figure 5:
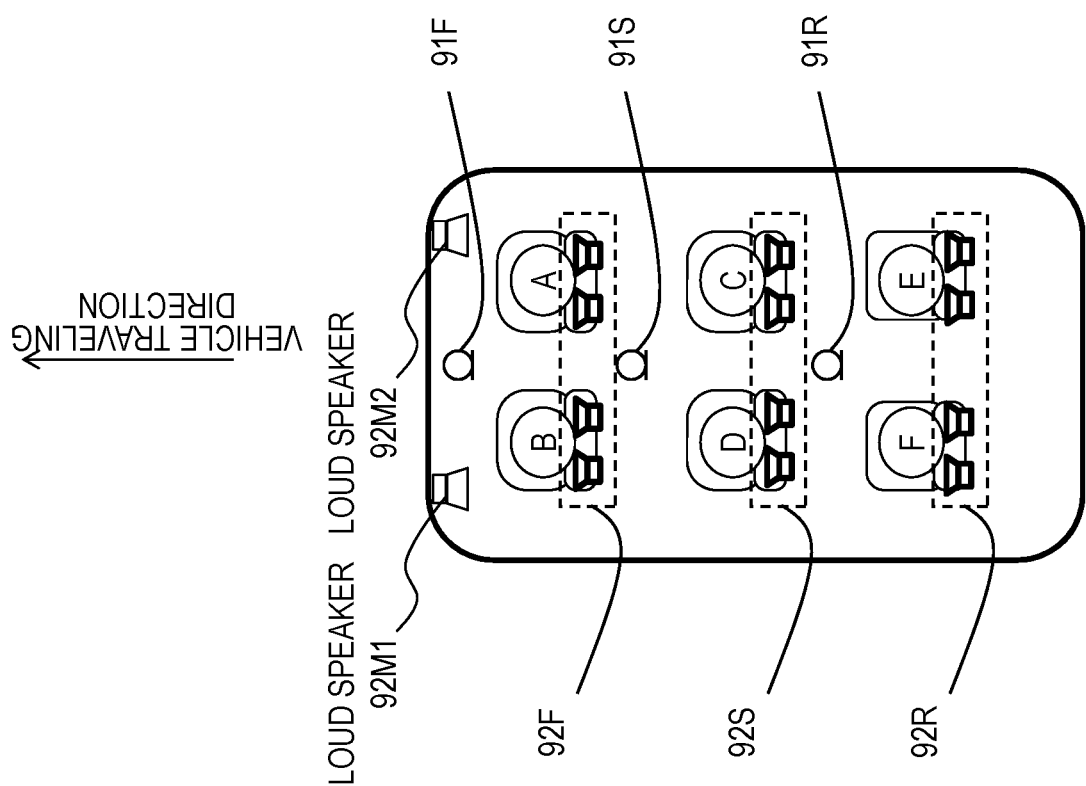
FIG. 5 is a view for explaining the structure of the vehicle on which the conversation support system according to the first embodiment is to be mounted.

In the present embodiment, a vehicle on which the conversation support system is to be mounted has a structure as illustrated in FIG. 4 and FIG. 5, and includes seats of three rows. Further, the vehicle in the present embodiment includes one seat each on the right and the left of each row, a microphone 91F which mainly collects speech of a speaker on the first row, a microphone 91S which mainly collects speech of a speaker on the second row, and a microphone 91R which mainly collects speech of a speaker on the third row. The microphones 91F, 91S and 91R are respectively constituted with M microphones. Note that F, S and R are indexes respectively indicating the first row, the second row and the third row of the vehicle. Further, the vehicle in the present embodiment includes one loud speaker each on the right and the left of each seat. A loud speaker 92F emits sound to speakers on the first row, a loud speaker 92S emits sound to speakers on the second row, and a loud speaker 92R emits sound to speakers on the third row.

The conversation support system receives input of sound pickup signals $y_1=[y_{1,2}, \ldots, y_{1,2}, \ldots y_{1,M}]$, $y_2=[y_{2,1}, y_{2,2}, \ldots, y_{2,M}]$ and $y_3=[y_{3,1}, y_{3,2}, \ldots, y_{3,M}]$ of three microphones 91F, 91S and 91R and reproduction signals (for example, audio signals) $m_l$ and $m_r$ to be reproduced at the loud speakers 92M1 and 92M2 of an in-vehicle acoustic apparatus (such as, for example, a car audio), emphasizes speech emitted from a designated area (hereinafter, also referred to as a sound pickup and reproduce area), outputs the speech to a loud speaker corresponding to a certain seat, emphasizes speech emitted from the seat from sound collected with a microphone corresponding to the seat, and outputs the speech to a loud speaker corresponding to the sound pickup and reproduce area, to support conversation of passengers in an automobile. Note that it is only necessary to provide at least one microphone which constitutes the microphones 91F, 91S and 91R for each sound pickup and reproduce area.

The conversation support system is, for example, a special apparatus which is constituted by a special program being loaded to a publicly known or dedicated computer including a central processing unit (CPU), a main storage apparatus (random access memory: RAM), and the like. The conversation support system, for example, executes respective kinds of processing under control by the central processing unit. Data input to the conversation support system and data obtained through the respective kinds of processing are, for example, stored in the main storage apparatus, and the data stored in the main storage apparatus is read out to the central processing unit as necessary and utilized for other processing. At least part of respective processing parts of the conversation support system may be constituted with hardware such as an integrated circuit. Respective storage parts of the conversation support system can be constituted with, for example, a main storage apparatus such as a random access memory (RAM) or middleware such as a relational database and a key value store. However, the conversation support system does not necessarily have to include the respective storage parts inside the system, and the respective storage parts may be constituted with an auxiliary storage apparatus which is constituted with a hard disk, an optical disk or a semiconductor memory device such as a flash memory, and may be provided outside the conversation support system.

The respective parts will be described below.

<Target Speech Emphasizing Part 110-X>

The target speech emphasizing part 110-X on a p-th row receives input of M sound pickup signals $y_{pm}$ (signals obtained from a m-th microphone on the p-th row), reference signals $s_q$ and $s_r$, reproduction signals $m_l$ and $m_r$ to be reproduced at the loud speakers 92M1 and 92M2 of the in-vehicle acoustic apparatus, and a speech switching control value c, obtains an emphasized signal $z_X$ by emphasizing target speech (speech emitted from a seat X) from the M sound pickup signals $y_{pm}$, and outputs the emphasized signal $z_X$. However, as described above, X=A, B, C, D, E, F, and A and B are on the first row, C and D are on the second row, and E and F are on the third row. p=1, 2, 3, q=1, 2, 3 and r=1, 2, 3 and q≠p, r≠p, and q≠r. The reference signals $s_1$, $s_2$ and $s_3$ are signals (a sum of emphasized signals of speakers on each row) respectively obtained by emphasizing speech of speakers on the first, the second and the third rows.

Figure 6:
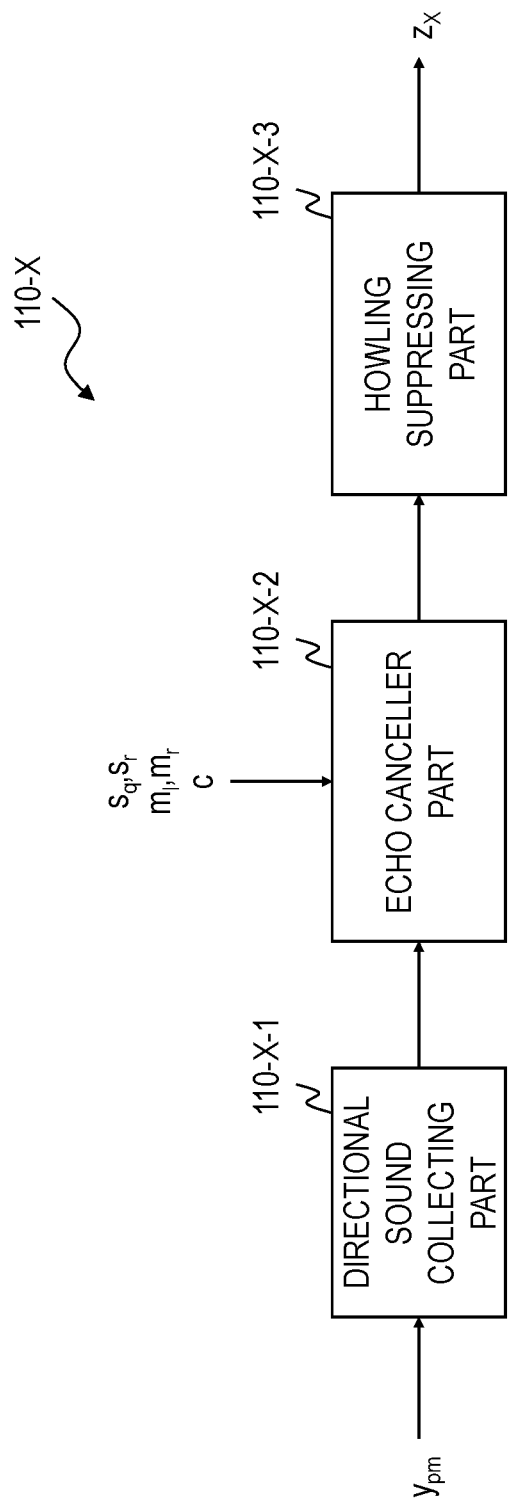
FIG. 6 is a functional block diagram of a target speech emphasizing part according to the first embodiment.

FIG. 6 is a functional block diagram of the target speech emphasizing part 110-X.

The target speech emphasizing part 110-X includes a directional sound collecting part 110-X-1, an echo canceller part 110-X-2, and a howling suppressing part 110-X-3. The respective parts will be described below.

(Directional Sound Collecting Part 110-X-1)

The directional sound collecting part 110-X-1 receives input of M sound pickup signals $y_{pm}$, obtains an emphasized signal $y'_x$ by emphasizing target speech (speech emitted from the seat X) from the M sound pickup signals $y_{pm}$ (S110-X-1), and outputs the emphasized signal $y'_x$.

Note that any method may be used to obtain the emphasized signal. For example, an emphasis technology in Japanese Patent Application Laid Open No. 2004-078021 can be employed.

(Echo Canceller Part 110-X-2)

The echo canceller part 110-X-2 receives input of the emphasized signal $y'_x$, the reference signals $s_q$ and $s_r$, the reproduction signals $m_l$ and $m_r$ to be reproduced at the loud speakers 92M1 and 92M2 of the in-vehicle acoustic apparatus, and the speech switching control value c, cancels sound components to be respectively reproduced at loud speakers on q-th and r-th rows (one of 92F, 92S and 92R) included in the emphasized signal y'$_x$ and sound components to be reproduced at the loud speakers 92M1 and 92M2, obtains an emphasized signal y"$_x$ by canceling echo components (S110-X-2) and outputs the emphasized signals y"$_x$. Processing to be performed by the echo canceller part 110-X-2 will be described in detail after description regarding how the reference signals $s_1$, $s_2$ and $s_3$ are acquired.

(Howling Suppressing Part 110-X-3)

The howling suppressing part 110-X-3 receives input of the emphasized signal y"$_x$, suppresses a howling component (S110-X-3), and outputs a signal after the howling component is suppressed as an emphasized signal $z_x$.

Note that any method may be used to suppress a howling component. For example, a howling suppression technology in Japanese Patent Application Laid Open No. 2007-221219 can be used.

<Speech Switching Part 120>

The speech switching part 120 receives input of six emphasized signals $z_x$ and the speech switching control value c=($c_{12}$, $c_{23}$, $c_{31}$). $c_{12}$, $c_{23}$ and $c_{31}$ respectively assume 0 or 1, and, for example, $c_12$=1 means that the first row is on a call with the second row, and $c_{12}$=0 means that the first row is not on a call with the second row.

The speech switching part 120 synthesizes the emphasized signal $z_x$ based on the speech switching control value c (S120), obtains reproduction signals $z_{12}$, $z_{13}$, $z_{21}$, $z_{23}$, $z_{31}$ and $z_{32}$ and outputs the reproduction signals $z_{pq}$ and $z_{pr}$ to the adding part 140-p. The reproduction signals $z_{pq}$ and $z_{pr}$ are signals respectively corresponding to speech from passengers on the q-th and the r-th rows to a passenger on the p-th row.

Further, the speech switching part 120 synthesizes the emphasized signal $z_x$ obtained by emphasizing the speech of the speaker on the p-th row, obtains a reference signal $s_p$ and outputs the reference signal $s_p$ to target speech emphasizing parts other than the target speech emphasizing part 110-X corresponding to the seat on the p-th row. For example, the reference signal 52 and the reference signal $s_3$ are input to target speech emphasizing part corresponding to the first row.

Figure 7:
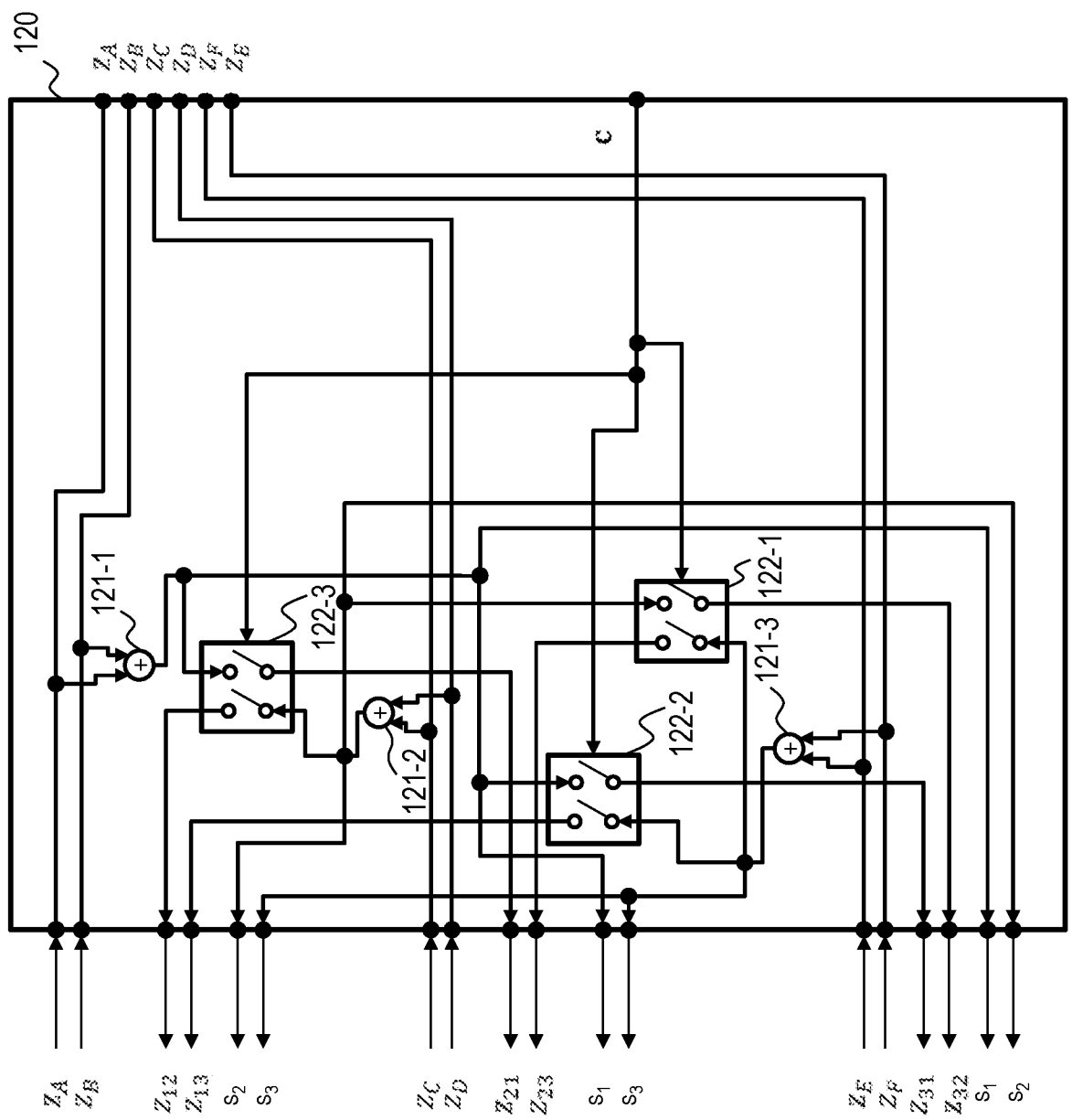
FIG. 7 is a functional block diagram of a speech switching part according to the first embodiment.

FIG. 7 is a functional block diagram of the speech switching part 120.

The speech switching part 120 includes three adding parts 121-p and three speech switching parts 122-p.

The speech switching part 122-p allows signals $z_{qr}$ and $z_{rq}$ coming from both directions to pass if a value of $c_{qr}$ is 1, and does not allow the signals to pass if the value of $c_{qr}$ is 0.

The adding part 121-p adds the emphasized signal $z_x$ corresponding to the seat on the p-th row, obtains reproduction signals $z_{qp}$ and $z_{rp}$ and outputs the reproduction signals $z_{qp}$ and $z_{rp}$.

Consequently, the reproduction signals are as follows:

$$z_{12} = \begin{cases} z_C + z_D & \text{if } c_{12} = 1 \\ 0 & \text{otherwise} \end{cases} \quad \text{[Formula 1]}$$

$$z_{13} = \begin{cases} z_E + z_F & \text{if } c_{31} = 1 \\ 0 & \text{otherwise} \end{cases}$$

$$z_{21} = \begin{cases} z_A + z_B & \text{if } c_{12} = 1 \\ 0 & \text{otherwise} \end{cases}$$

$$z_{23} = \begin{cases} z_E + z_F & \text{if } c_{23} = 1 \\ 0 & \text{otherwise} \end{cases}$$

$$z_{31} = \begin{cases} z_A + z_B & \text{if } c_{31} = 1 \\ 0 & \text{otherwise} \end{cases}$$

$$z_{32} = \begin{cases} z_C + z_D & \text{if } c_{23} = 1 \\ 0 & \text{otherwise} \end{cases}$$

Further, the speech switching part 120 outputs the emphasized signal $z_x$ to the speech switching control part 130.

Further, the adding part 121-p adds the emphasized signal $z_x$ corresponding to the seat on the p-th row, obtains the reference signal $s_p$ and outputs the reference signal $s_p$ to target speech emphasizing parts other than the target speech emphasizing part 110-X corresponding to the seat on the p-th row. Consequently, the reference signal is as follows:

$$s_1 = z_A + z_B$$

$$s_2 = z_C + z_D$$

$$s_3 = z_E + z_F \quad \text{[Formula 2]}$$

Note that if a value of $c_{pq}$ is 1, the reference signal $s_p$ becomes the same as the reproduction signal $z_{qp}$. In other words, while the reproduction signal is a signal obtained by adding the emphasized signal $z_x$ corresponding to the seat on the p-th row only in a case where a passenger on the seat on the p-th row is on a call, the reference signal is a signal obtained by adding the emphasized signal $z_x$ corresponding to the seat on the p-th row regardless of whether or not the passenger is on a call. This is because it is necessary to input the reference signal also to target speech emphasizing parts on rows which are not output targets so that appropriate processing is performed on sound output from loud speakers on other rows. For example, also in a case where a path is configured between the second row and the third row (in a case where the second row is on a call with the third row), sound collected with a microphone on the first row (row which is not an output target) includes sound on the third row emitted from a loud speaker on the second row, and sound on the second row emitted from the loud speaker on the third row, and thus, the echo canceller parts 110-A-2 and 110-B-2 of the target speech emphasizing parts 110-A and 110-B corresponding to the first row require to cancel sound collected from the microphone on the first row using these kinds of sound as reference signals (input).

<Speech Switching Control Part 130>

The speech switching control part 130 designates a desired sound pickup and reproduce area based on designation by a passenger sitting in a certain seat (S130), obtains a speech switching control value c indicating whether or not the passenger sitting in the certain seat is on a call with the desired sound pickup and reproduce area and outputs the speech switching control value c. The speech switching control value c which connects a path between the desired sound pickup and reproduce area and the passenger sitting in the certain seat if the passenger is on a call, and prevents connection of a path if the passenger is not on a call, can be regarded as controlling sorting of speech.

In this example, the desired sound pickup and reproduce area is designated using a switch provided at an automobile using a result of recognizing speech emitted by the passenger sitting in the certain seat. In this case, the speech switching control part 130 acquires content designated by the passenger using six emphasized speech $z_x$ which are input, designates the desired sound pickup and reproduce area and obtains the speech switching control value c.

Figure 8:
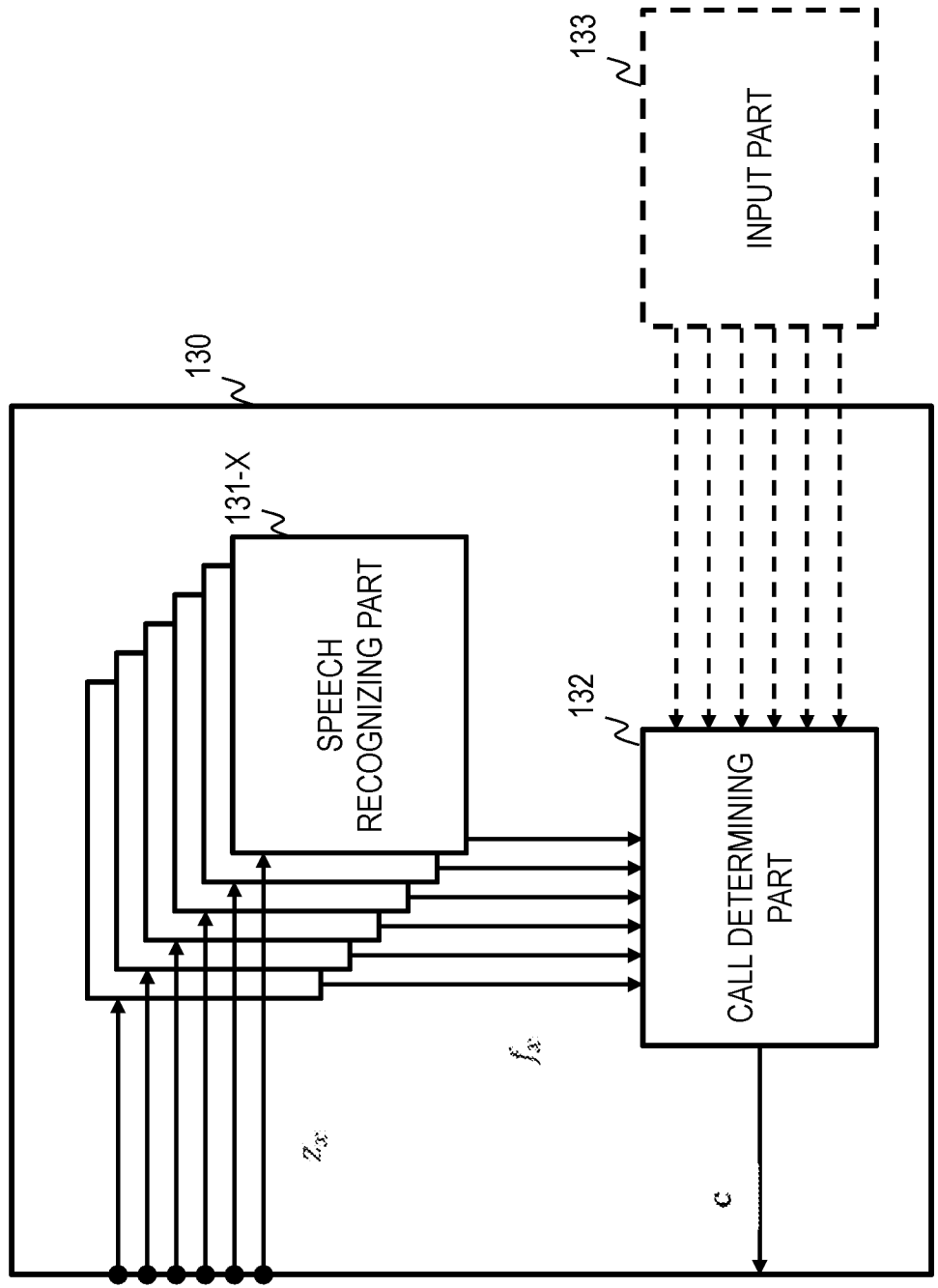
FIG. 8 is a functional block diagram of a speech switching control part according to the first embodiment.

FIG. 8 is a functional block diagram of the speech switching control part 130.

The speech switching control part 130 includes six speech recognizing parts 131-X and a call determining part 132.

The speech recognizing part 131-X receives input of the emphasized speech $z_x$, recognizes the emphasized speech $z_x$ and outputs a corresponding determination value $f_x$ in a case where the speech recognizing part 131-X recognizes that specific speech has been emitted. For example, the determination value $f_x$ assumes one of 0, 1, 2 and 3. x of the determination value $f_x$ indicates a speaker (passenger), and the determination value $f_x$ itself indicates a call destination. For example, in a case where a word indicating start of conversation with a row of the call destination corresponding to the sound pickup and reproduce area is included in the speech recognition result corresponding to one speech, the determination value $f_x$ indicating that the speaker starts conversation with the row of the call destination is set. For example, the speech switching control part 130 sets $f_x=1$ in a case where the speech recognition result of the emphasized speech $z_x$ is "conversation with the first row", sets $f_x=2$ in a case where the result is "conversation with the second row", sets $f_x=3$ in a case where the result is "conversation with the third row", and sets $f_x=0$ in a case of other recognition results or in a case of silence.

The call determining part 132 receives input of six determination values $f_x$ and obtains the speech switching control value $c=(c_{12}, c_{23}, c_{31})$ based on the six determination values $f_x$ while setting $$c_{12} = \begin{cases} 1 & \text{if } f_A = 2 \text{ or } f_B = 2 \text{ or } f_C = 1 \text{ or } f_D = 1 \\ 0 & \text{otherwise} \end{cases} \quad \text{[Formula 3]}$$

$$c_{23} = \begin{cases} 1 & \text{if } f_C = 3 \text{ or } f_D = 3 \text{ or } f_E = 2 \text{ or } f_F = 2 \\ 0 & \text{otherwise} \end{cases}$$

$$c_{31} = \begin{cases} 1 & \text{if } f_A = 3 \text{ or } f_B = 3 \text{ or } f_E = 1 \text{ or } f_F = 1 \\ 0 & \text{otherwise} \end{cases}$$

and outputs the speech switching control value $c=(c_{12}, c_{23}, c_{31})$.

For example, it is also possible to set 0 as initial values of all $f_x$ and perform sound pickup and amplification processing until conversation ends after a value of $f_x$ becomes a value other than 0 once. For example, in a case where a word indicating end of conversation is included in the speech recognition result corresponding to one speech, the determination value $f_x$ indicating that the speaker ends conversation with the row of the call destination is set. For example, in a case where the speech recognition result of the emphasized speech $z_x$ is "end of conversation", $f_x$ is set at 0 and output.

Figure 9:
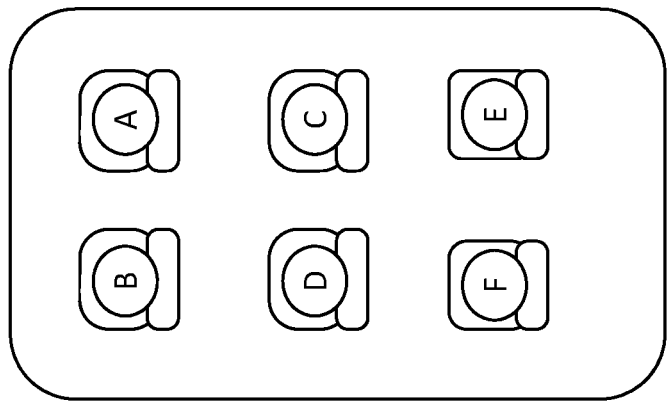
FIG. 9 is a view illustrating a display example at a display part according to the first embodiment.
Figure 10:
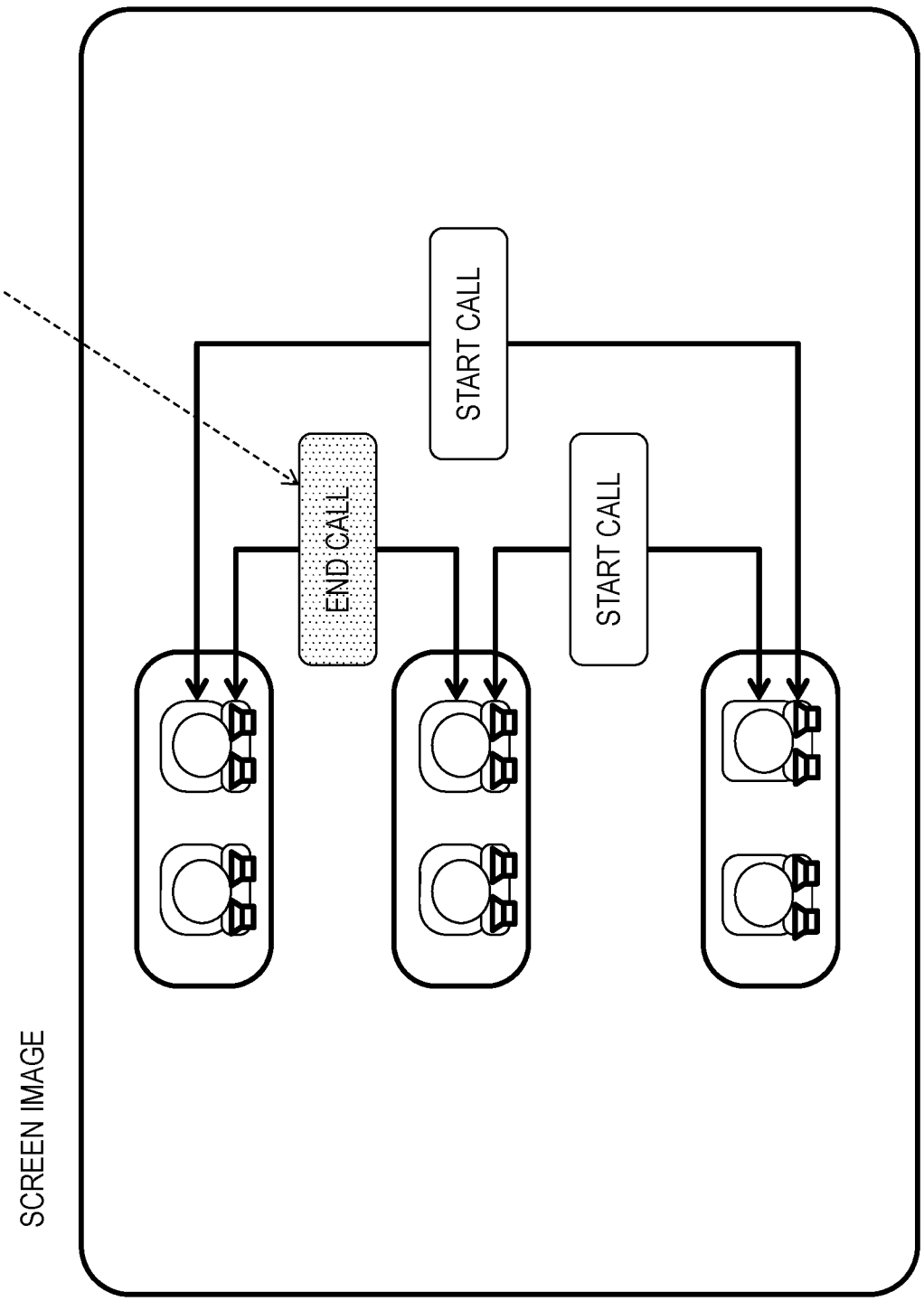
FIG. 10 is a view illustrating a display example at the display part according to the first embodiment.

Note that as a simpler method, it is also possible to use a method in which the speech switching control value c is determined using a physical switch at each seat without using speech recognition. In this example, a sound pickup and reproduce area designated by a passenger who views a display part which can display a plurality of sound pickup and reproduce areas is designated as a desired sound pickup and reproduce area (start of a call). Further, designation of the sound pickup and reproduce area designated as the sound pickup and reproduce area is unset by the passenger who views the display part (end of a call). In this case, the speech switching control part 130 obtains the speech switching control value c based on a value input using a switch, or the like, and outputs the speech switching control value c. For example, a switch as illustrated in FIG. 9 (corresponding to the above-described display part) and a touch panel which displays a figure as illustrated in FIG. 10 (corresponding to the above-described display part) are provided at each seat. Note that FIG. 10 illustrates a state where start and end of a call are controlled for each row, start and end of a call may be controlled for each seat. In FIG. 8, an input part 133 indicated with a dashed line corresponds to a switch and a touch panel.

If a passenger on a certain seat depresses (in a case of a switch) or touches (in a case of a touch panel) a portion indicating another seat, the call determining part 132 can obtain a signal indicating the seat of the passenger and the seat which is depressed, or the like, as input. This input signal is used as the determination value $f_x$ indicating that the passenger starts conversation with a row of a conversation partner. For example, $f_x=1$ can be obtained as input in a case where a portion indicating seats A and B on the first row is depressed, or the like, $f_x=2$ can be obtained as input in a case where a portion indicating seats C and D on the second row is depressed, or the like, $f_x=3$ can be obtained as input in a case where a portion indicating seats E and F on the third row is depressed, or the like, and $f_x=0$ can be obtained as input in a case where no portion indicating seats is depressed, or the like, or in a case where a portion indicating a seat for which sound pickup and amplification processing is to be performed is depressed, or the like, again during sound pickup and amplification processing. Note that x in $f_x$ indicates a seat at which a switch, or the like, which is depressed, or the like, is provided. A method for obtaining the speech switching control value $c=(c_{12}, c_{23}, c_{31})$ from six determination values $f_x$ is similar to that in a case where speech recognition is utilized.

<Adding Part 140-p>

The adding part 140-p receives input of the reproduction signals $z_{pq}$ and $z_{pr}$, adds the two reproduction signals (S140) and outputs the sum as a reproduction signal $k_p$. The adding part 140-p outputs reproduction signals $k_1$, $k_2$ and $k_3$ respectively to the loud speakers 92F, 92S and 92R.

With such a configuration, the adding part 140-p outputs a signal obtained by emphasizing speech emitted from the designated sound pickup and reproduce area to a loud speaker corresponding to a seat of a passenger who has designated the sound pickup and reproduce area, and the adding part 140-p' outputs a signal obtained by emphasizing speech, which is collected with a microphone corresponding to the seat of the passenger who has designated the sound pickup and reproduce area and which is emitted from the seat of the passenger who has designated the sound pickup and reproduce area, to a loud speaker corresponding to the sound pickup and reproduce area. Note that p' is an index indicating the designated sound pickup and reproduce area, and p≠p'.

Further, control using the speech switching control value c enables control so that sound collected with microphones corresponding to seats other than the seat of the passenger who has designated the sound pickup and reproduce area is not output to a loud speaker corresponding to the desired sound pickup and reproduce area.

(Details of Echo Canceller Part 110-X-2)

The echo canceller part 110-X-2 on the p-th row will be described in detail.

Figure 11:
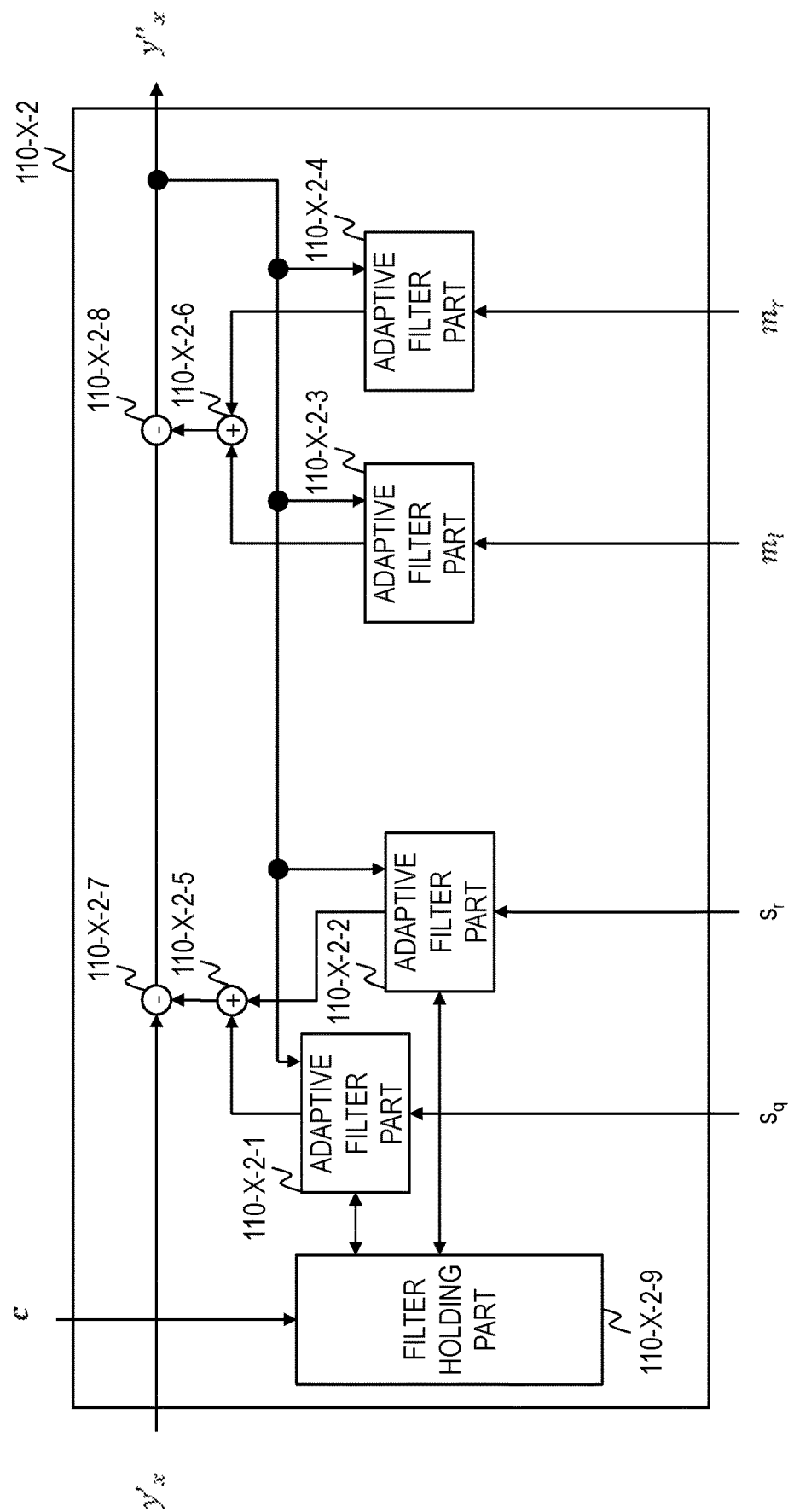
FIG. 11 is a functional block diagram of an echo canceller according to the first embodiment.

FIG. 11 is a functional block diagram of the echo canceller part 110-X-2. The echo canceller part 110-X-2 includes adaptive filter parts 110-X-2-1, 110-X-2-2, 110-X-

2-3 and 110-X-2-4, adding parts 110-X-2-5 and 110-X-2-6, subtracting parts 110-X-2-7 and 110-X-2-8, and a filter holding part 110-X-2-9.

First, an emphasized signal $y'_x$ which is an input signal of the echo canceller part 110-X-2 will be described. The emphasized signal $y'_x$ input to the echo canceller part 110-X-2 on the p-th row can be expressed as follows using the received speech switching control value c. It is assumed that respective signals are expressed with complex numbers of frequency components of the signals.

$$y'_x = \sum_{m=1}^{M} w_{xm} y_{pm} =$$

$$\left\{\sum_{m=1}^{M} w_{xm} h_{ppm}\right\}\{c_{pq}s_q + c_{rp}s_r\} + \left\{\sum_{m=1}^{M} w_{xm} h_{qpm}\right\}$$

$$\{c_{pq}s_p + c_{qr}s_r\} + \left\{\sum_{m=1}^{M} w_{xm} h_{rpm}\right\}\{c_{rp}s_p + c_{qr}s_q\} =$$

$$(h'_{qp}c_{pq} + h'_{rp}c_{rp})s_p + (h'_{pp}c_{pq} + h'_{rp}c_{qr})s_q +$$

$$(h'_{pp}c_{rp} + h'_{qp}c_{qr})s_r$$

[Formula 4]

Here, $w_{xm}$ is a filter coefficient to be multiplied by the sound pickup signal $y_{pm}$ to emphasize speech of an x-th seat. The filter coefficient can be determined using, for example, delay-and-sum beamformer, or the like. Further, $h_{ppm}$, $h_{qpm}$ and $h_{rpm}$ respectively indicate space transfer characteristics from loud speakers on the p-th row, the q-th row and the r-th row to an m-th microphone on the p-th row. $h'_{qp}$, $h'_{rp}$ and $h'_{pp}$ are respectively characters substituted for product sums of the filter coefficients and the space transfer characteristics in the above expression.

$$\left\{\sum_{m=1}^{M} w_{xm} h_{qpm}\right\}, \left\{\sum_{m=1}^{M} w_{xm} h_{rpm}\right\}, \left\{\sum_{m=1}^{M} w_{xm} h_{ppm}\right\}$$

[Formula 5]

Note that a term relating to $s_p$ is excluded from a cancellation target at the echo canceller part 110-X-2 for the purpose of avoiding speech which should be collected and which is desired to be collected from being cancelled as a result of causing the echo canceller to operate, and terms relating to $s_q$ and $s_r$ are cancelled. It can be read from the expression that a term relating to a transfer function of these signals can change to three patterns (except a case of 0) in accordance with the value of the speech switching control value c. Thus, at the filter holding part 110-X-2-9, for example, three patterns of buffers such as When $c_{pq}=0$, $c_{qr}=1$, $\hat{h}_q = \hat{h}_{q,1}$ When $c_{pq}=1$, $c_{qr}=0$, $\hat{h}_q = \hat{h}_{q,2}$ When $c_{pq}=1$, $c_{qr}=1$, $\hat{h}_q = \hat{h}_{q,3}$

[Formula 6]

are prepared as filters which perform updating using the reference signal $s_q$ for a filter coefficient of the adaptive filter part 110-X-2-1 corresponding to the q-th row, and load and store of the filter is implemented in accordance with the value of the speech switching control value c. For example, when $c_{pq}=1$, $c_{qr}=0$ changes to $c_{pq}=1$, $c_{qr}=1$, a filter coefficient $\hat{h}_q$ at original time is held in the filter holding part 110-X-9 as $\hat{h}_{q,2}$ and generation and updating of a pseudo echo signal are restarted while a value $\hat{h}_q$ to be used as the filter coefficient is replaced with $\hat{h}_{q,3}$ in the filter holding part 110-X-9 in place of $\hat{h}_{q,2}$. At this time, an adaptive filter on the q-th row is updated based on a transfer function (transfer characteristics corresponding to $h'_{pp}$) between a loud speaker corresponding to a passenger on a seat on the p-th row and M microphones which collect speech of the passenger on a seat on the p-th row, a transfer function (transfer characteristics corresponding to $h'_{rp}$) between a loud speaker corresponding to a passenger on a seat on the r-th row and M microphones, and a transfer function (transfer characteristics corresponding to $h'_{pp}+h'_{rp}$) obtained by adding the both transfer functions. Processing at the respective parts will be described below.

The filter holding part 110-X-9 on the p-th row holds filters $\hat{h}_{q,1}$, $\hat{h}_{q,2}$ and $\hat{h}_{q,3}$ for the adaptive filter part 110-X-2-1, and filters $\hat{h}_{r,1}$, $\hat{h}_{r,2}$ and $\hat{h}_{r,3}$ for the adaptive filter part 110-X-2-2. The filter holding part 110-X-9 on the p-th row which receives the speech switching control value $c=(c_{pq}, c_{qr}, c_{rp})$, outputs the filters $\hat{h}_q$ and $\hat{h}_r$ corresponding to the held speech switching control value c and receives and holds the filters $\hat{h}_q$ and $\hat{h}_r$ which have been used until that time point. Correspondence relationship is as follows.

When $c_{pq}=0$, $c_{qr}=1$, $\hat{h}_g = \hat{h}_{q,1}$

When $c_{pq}=1$, $c_{qr}=0$, $\hat{h}_g = \hat{h}_{q,2}$

When $c_{pq}=1$, $c_{qr}=1$, $\hat{h}_q = \hat{h}_{q,3}$

When $c_{rq}=0$, $c_{qr}=1$, $\hat{h}_r = \hat{h}_{r,1}$

When $c_{rq}=1$, $c_{qr}=0$, $\hat{h}_r = \hat{h}_{r,2}$

When $c_{rq}=1$, $c_{qr}=1$, $\hat{h}_r = \hat{h}_{r,3}$

[Formula 7]

Note that a timing at which the speech switching control value c is received may be set as appropriate. For example, the speech switching control value c may be received every time the speech switching control value c is changed.

In short, the filter holding part 110-X-9 on the p-th row makes the adaptive filter to be used for cancelling echo different among a case where the passenger sitting in the seat on the q-th row holds a conversation with only the passenger sitting in the seat on the p-th row, a case where the passenger sitting in the seat on the q-th row holds a conversation with only the passenger sitting in the seat on the r-th row, and a case where the passenger sitting in the seat on the q-th row holds a conversation with both the passenger sitting in the seat on the p-th row and the passenger sitting in the seat on the r-th row. This is intended to solve the following problem. While, for example, an acoustic field is the same inside a car, actually, collected sound is different in accordance with seats and rows. For example, even with a microphone placed so as to easily collect sound of the passenger on the first row, characteristics of sound to be collected is different in accordance with a difference in a position of a loud speaker which emits sound (that is, an acoustic path). Thus, if the same echo canceller is used, there is a case where echo remains in accordance with "which loud speaker reproduces a signal" even for the same signal, and, it is therefore necessary to switch a filter in accordance with the acoustic path.

The adaptive filter parts 110-X-2-1 and 110-X-2-2 respectively receive filters $\hat{h}_q$ and $\hat{h}_r$ and set the filters to be used for filtering.

The adaptive filter parts 110-X-2-1 and 110-X-2-2 respectively receive input of the reference signals $s_q$ and $s_r$, filter the reference signals $s_q$ and $s_r$ using the respective adaptive filters $\hat{h}_q$ and $\hat{h}_r$, and generate and output pseudo echo $Y_{q,1}$ and $Y_{r,1}$.

The adding part 110-X-2-5 receives input of the pseudo echo $Y_{q,1}$ and $Y_{r,1}$, sets a sum of these values as pseudo echo $Y_1$ and outputs the pseudo echo $Y_1$.

The subtracting part 110-X-2-7 receives input of the emphasized signal $y'_x$ and the pseudo echo $Y_1$, subtracts the pseudo echo $Y_1$ from the emphasized signal $y'_x$, obtains the emphasized signal $y'_{x,1}$ and outputs the emphasized signal $y'_{x,1}$.

The adaptive filter parts 110-X-2-3 and 110-X-2-4 respectively receive input of reproduction signals $m_l$ and $m_r$, filter the reproduction signals $m_l$ and $m_r$ using the respective adaptive filters, generate pseudo echo $Y_{1,2}$ and $Y_{r,2}$ and output the pseudo echo $Y_{1,2}$ and $Y_{r,2}$.

The adding part 110-X-2-5 receives input of the pseudo echo $Y_{1,2}$ and $Y_{r,2}$, sets a sum of these values as pseudo echo $Y_2$, and outputs the pseudo echo $Y_2$.

The subtracting part 110-X-2-7 receives input of the emphasized signal $y'_{x,1}$ and the pseudo echo $Y_2$, subtracts the pseudo echo $Y_2$ from the emphasized signal $y'_{x,1}$, obtains an emphasized signal $y''_x$ and outputs the emphasized signal $y''_x$.

Further, the adaptive filter parts 110-X-2-1, 110-X-2-2, 110-X-2-3 and 110-X-2-4 receive input of the emphasized signal $y''_x$ (corresponding to an error signal) obtained by cancelling echo components, and respectively update the adaptive filters using the reference signals $s_q$ and $s_r$, the reproduction signals $m_l$ and $m_r$ and the emphasized signal $y''_x$. Note that the adaptive filters to be updated at the adaptive filter parts 110-X-2-1 and 110-X-2-2 are not the adaptive filters held in the filter holding part 110-X-2-9, but the adaptive filters utilized to obtain the emphasized signal $y''_x$.

There are various methods as a method for updating the adaptive filter. For example, a filter can be updated using an NLMS algorithm, or the like, disclosed in reference literature 1.

(Reference literature 1) Juro Oga, Yoshio Yamazaki, Yutaka Kaneda, "Acoustic System and Digital Processing", edited by Institute of Electronics, Information and Communication Engineers, Corona Publishing Co., Ltd, 1995, pp. 140-141

<Effects>

According to the above-described configuration, it is possible to change operation when a passenger on an arbitrary seat desires to hold a conversation or stop the conversation regardless of a position of a seat and a row, and appropriately execute processing such as echo cancellation.

Modified Examples

While, in the present embodiment, a signal of two channels is used as a reproduction signal to be reproduced at the loud speaker of the in-vehicle acoustic apparatus, a signal of one channel or three or more channels may be used in accordance with the loud speaker of the in-vehicle acoustic apparatus.

While, in the present embodiment, the directional sound collecting part 110-X-1 is provided, for example, if an emphasized signal obtained by emphasizing target sound emitted from a seat can be obtained using a directional microphone having directionality with respect to the seat which is a sound pickup target, an output value of the directional microphone may be output to the echo canceller part 110-X-2 without using the directional sound collecting part 110-X-1.

While the present embodiment has been described using an automobile having seats of three rows, the present embodiment may be applied to a vehicle having seats of two rows or having seats of four or more rows as well as seats of three rows. The point is that it is only necessary to apply the present embodiment in a case where seats are positioned such that voices are hard to hear at a normal volume of conversation in a common acoustic field inside a vehicle due to driving sound, reproduced sound of a car audio, other sound outside the vehicle, and the like.

Further, while, in the present embodiment, control between rows of seats inside an automobile has been described, similar control may be performed between seats inside an automobile. In this case, a desired sound pickup and reproduce area refers to not a desired row but, a desired seat.

Further, while, in the present embodiment, a seat on a certain row inside a car is set as the desired sound pickup and reproduce area, an area outside a car may be set as the desired sound pickup and reproduce area. For example, in a case where a passenger makes a hands-free call with a telephone outside a car, an area defined by a loud speaker and a microphone of a call destination may be set as the desired sound pickup and reproduce area. Further, in a case where a call partner holds a conversation while putting his/her ear against a receiver, the call partner will be also referred to as a sound pickup and amplification target.

While, in the present embodiment, six speech recognizing parts 131-X within the speech switching control part 130 perform speech recognition processing, it is also possible to employ a configuration where the emphasized speech $z_x$ is transmitted to a speech recognizing part provided outside the conversation support system, this external speech recognizing part performs speech recognition processing, and the conversation support system receives a recognition result. In this case, the six speech recognizing parts 131-X obtain the determination value $f_x$ using the speech recognition result and output the determination value $f_x$.

While, in the present embodiment, the speech switching part 122-$p$ within the speech switching part 120 performs control to allow the signals $z_{qr}$ and $z_{rq}$ coming from both directions to pass if the value of $c_{qr}$ is 1, and not to allow the signals $z_{qr}$ and $z_{rq}$ to pass if the value of $c_{qr}$ is 0, it is also possible to allow the signals $z_{qr}$ and $z_{rq}$ to always pass without providing the speech switching part 122-$p$, use the signals $z_{qr}$ and $z_{rq}$ as reference signals at the target speech emphasizing part 110-X, and control whether or not to add the signals at the adding part 140-P based on the speech switching control value c immediately before the adding part 140-$p$.

Other Modified Examples

The present invention is not limited to the above-described embodiment and modified examples. For example, the above-described various kinds of processing may be executed in parallel or individually in accordance with processing performance of apparatuses which execute the processing or as necessary as well as being executed in chronological order in accordance with description. In addition, the present invention can be changed as appropriate within the scope not deviating from the gist of the present invention.

<Program and Recording Medium>

Further, various kinds of processing functions at the respective apparatuses described in the above-described embodiment and modified examples may be implemented with a computer. In this case, details of processing of functions to be performed by the respective apparatuses are described with a program. The above-described various kinds of processing functions at the respective apparatuses are implemented on the computer by this program being executed on the computer.

The program which describes details of the processing can be recorded in a computer-readable recording medium. Examples of the computer-readable recording medium can include, for example, a magnetic recording apparatus, an optical disk, a magnetooptical recording medium and a semiconductor memory.

Further, this program is distributed by, for example, a portable recording medium such as a DVD and a CD-ROM in which the program is recorded being sold, given, lent, or the like. Still further, it is also possible to distribute this program by storing the program in a storage apparatus of a server computer and transferring the program from the server computer to other computers via a network.

A computer which executes such a program, for example, first, stores a program recorded in the portable recording medium or a program transferred from the server computer in a storage part of the own computer once. Then, upon execution of the processing, this computer reads the program stored in the storage part of the own computer and executes the processing in accordance with the read program. Further, as another execution form of this program, the computer may directly read a program from the portable recording medium and execute the processing in accordance with the program. Still further, the computer may sequentially execute the processing in accordance with the received program every time the program is transferred from the server computer to this computer. Further, it is also possible to employ a configuration where the above-described processing is executed by so-called application service provider (ASP) service which implements processing functions only by an instruction of execution and acquisition of a result without the program being transferred from the server computer to this computer. Note that, it is assumed that the program includes information which is to be used for processing by an electronic computer, and which is equivalent to a program (not a direct command to the computer, but data, or the like, having property specifying processing of the computer).

Further, while the respective apparatuses are constituted by a predetermined program being executed on the computer, at least part of the processing may be implemented with hardware.

What is claimed is:

1. A conversation support system which supports conversation of passengers in an automobile,
   seats of at least two or more rows being placed in the automobile,
   the conversation support system comprising:
   processing circuitry configured to:
   execute speech switching control processing in which the processing circuitry designates a desired sound pickup and amplification target or sound pickup and reproduce area based on designation by a first passenger sitting in a first seat; and
   execute first target speech emphasizing processing in which the processing circuitry outputs a signal obtained by emphasizing speech emitted from the designated sound pickup and amplification target or the sound pickup and reproduce area to a loud speaker corresponding to the first seat; and
   execute second target speech emphasizing processing in which the processing circuitry outputs a signal obtained by emphasizing speech, which is collected with a microphone corresponding to the first seat and which is emitted from the first seat, to a loud speaker corresponding to the sound pickup and amplification target or the sound pickup and reproduce area,
   wherein the processing circuitry is configured to make a filter to be used for cancelling echo different among a case where a second passenger holds a conversation with only the first passenger, a case where the second passenger holds a conversation with only a third passenger other than the first passenger, and a case where the second passenger holds a conversation with both the first passenger and the third passenger, and
   the filter is updated based on a transfer function between a loud speaker corresponding to the first passenger and a microphone which collects speech of the first passenger, a transfer function between a loud speaker corresponding to the third passenger and the microphone, and a transfer function obtained by adding both of the transfer functions.

2. The conversation support system according to claim 1, wherein, in the speech switching control processing, the sound pickup and amplification target or the sound pickup and reproduce area is designated with a switch placed in the automobile using a result of recognizing speech emitted by the first passenger or designated by the first passenger who views a display part which can display a plurality of sound pickup and amplification targets or sound pickup and reproduce areas.

3. The conversation support system according to claim 1, wherein, in the speech switching control processing, the sound pickup and amplification target or the sound pickup and reproduce area is designated by the first passenger who views a display part which can display a plurality of sound pickup and amplification targets or sound pickup and reproduce areas,
   designation of the sound pickup and amplification target or the sound pickup and reproduce area designated as the desired sound pickup and amplification target or sound pickup and reproduce area is unset by the first passenger who views the display part, and
   the sound pickup and amplification target or the sound pickup and reproduce area is set for each seat or each row of the automobile.

4. The conversation support system according to claim 1, wherein, in the second target speech emphasizing processing, the processing circuitry does not output sound collected by a microphone corresponding to a seat other than the first seat to the loud speaker corresponding to the desired sound pickup and amplification target or sound pickup and reproduce area.

5. A conversation support method which uses a conversation support system which supports conversation of passengers in an automobile and includes processing circuitry, seats of at least two or more rows being placed in the automobile,
   the conversation support method comprising:
   a speech switching control step in which the processing circuitry designates a desired sound pickup and reproduce area based on designation by a first passenger sitting in a first seat;
   a first target speech emphasizing step in which the processing circuitry outputs a signal obtained by emphasizing speech emitted from the designated sound pickup and reproduce area to a loud speaker corresponding to the first seat;

a second target speech emphasizing step in which the processing circuitry outputs a signal obtained by emphasizing speech, which is collected with a microphone corresponding to the first seat and which is emitted from the first seat, to a loud speaker corresponding to the sound pickup and reproduce area; and an echo cancelling step in which the processing circuitry makes a filter to be used for cancelling echo different among a case where a second passenger holds a conversation with only the first passenger, a case where the second passenger holds a conversation with only a third passenger other than the first passenger, and a case where the second passenger holds a conversation with both the first passenger and the third passenger, wherein the filter is updated based on a transfer function between a loud speaker corresponding to the first passenger and a microphone which collects speech of the first passenger, a transfer function between a loud speaker corresponding to the third passenger and the microphone, and a transfer function obtained by adding both of the transfer functions.

6. The conversation support method according to claim 5, wherein, in the speech switching control step, the sound pickup and reproduce area is designated with a switch placed in the automobile using a result of recognizing speech emitted by the first passenger or designated by the first passenger who views a display part which can display a plurality of sound pickup and reproduce areas.

7. A non-transitory computer-readable recording medium that records a program for causing a computer to function as the conversation support system according to claim 1.

* * * * *